United States Patent Office 2,731,416
Patented Jan. 17, 1956

2,731,416

CHEMICAL COMPOUNDS, METHODS OF MAKING SAME, AND LUBRICANTS CONTAINING THE CHEMICAL COMPOUNDS

Oliver L. Brandes, Gibsonia, and Earl L. Humphrey, Penn Township, Allegheny County, Pa., assignors to Gulf Research & Development Company, Pittsburgh, Pa., a corporation of Delaware No Drawing. Application April 2, 1953,
Serial No. 346,542

17 Claims. (Cl. 252—37.7)

This invention relates to new compounds and to methods of making such compounds. The invention also relates to lubricating compositions containing the new compounds.

We have discovered, in accordance with the invention, that valuable new compounds can be prepared by reacting a mixture comprising naphthenic acids and at least one phenol in the presence of a Friedel-Crafts catalyst, such as aluminum chloride, aluminum chloride-containing compounds or complexes, aluminum bromide, aluminum iodide, ferric chloride, antimony trichloride, antimony pentachloride, zinc chloride, zinc fluoride, tin chloride, boron trifluoride, titanium chloride, zirconium chloride, and the like, at an elevated temperature of at least about 200° F. for a time sufficient to effect reaction between the naphthenic acids and the phenol, and thereafter converting the resulting reaction product to the corresponding metal salt.

The phenols which may be employed in our invention in the reaction with naphthenic acids include monocyclic phenols, as well as derivatives thereof, and polycyclic phenols such as naphthols and bis-phenols.

The phenols which are preferred, in accordance with the invention, are monocyclic phenols, such as phenol itself and derivatives of phenol, which are free of substituents which adversely affect the course of the reaction. Especially advantageous phenols for use in the present process are alkylated phenols, particularly such phenols in which the alkyl groups are lower alkyl groups such as methyl, ethyl, propyl, isobutyl, and the like. For example, advantageous results have been obtained in accordance with the invention with the use of cresols and especially p-cresol. The class of phenols preferred for use in accordance with our invention may be represented by the following general formula:

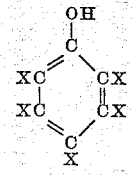

wherein X is selected from the group consisting of hydrogen and alkyl groups having from one to 12 carbon atoms, with the number of hydrogen atoms per molecule being at least 1 and preferably two.

While the above class of phenols are preferred in reactions with naphthenic acids in accordance with our invention, we may also employ other phenolic-type compounds in reactions with the naphthenic acids. Thus naphthols having the following structural formula may be used:

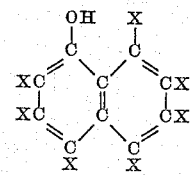

where X is selected from the group consisting of hydrogen and alkyl groups having from one to 12 carbon atoms, with the number of hydrogen atoms per molecule being at least one and preferably two. In addition bis-phenols having the following structural formula may be employed:

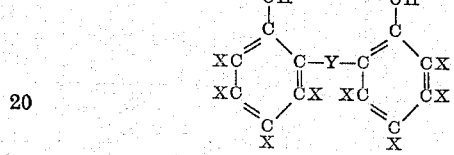

where X is selected from the group consisting of hydrogen and alkyl groups having from one to 12 carbon atoms, with the number of hydrogen atoms in each ring being at least one and preferably two, and Y=S, —S—S— or

where R and R' may be hydrogen, alkyl, aryl, cycloalkyl, alkaryl or aralkyl. In reactions where the above naphthols or bis-phenols are employed, a mol of the naphthols or bis-phenols may be reacted with from one to 2 mols of naphthenic acids to obtain the desired reaction product.

While any of the available naphthenic acids can be employed in the practice of our invention, we prefer to employ naphthenic acids having the following characteristics:

Neutralization number _____ 100 to 275
Saponification number _____ 100 to 300
Molecular weight _____ 200 to 500

Dicyclic as well as dicarboxylic naphthenic acids can be employed in the reaction of our invention. We have found that for best results monocyclic monocarboxylic naphthenic acids are preferred.

While we are not aware of the reaction product nor of the metal salts derived therefrom, we have found, nevertheless, that in order to obtain the desired intermediate reaction product it is important that the temperature during the reaction be at least about 200° F. Substanially higher temperatures can be used provided they are not so high as to initiate charring reactions. We have found that best results are obained by conducting the reaction at a temperature of about 300° F. to about 375° F.

In one method of practicing our invention, a mixture comprising naphthenic acids, a phenol, a Friedel-Crafts catalyst and an organic solvent is stirred and kept at slow reflux at an elevated temperature for a time sufficient to effect reaction between the naphthenic acids and the phenol. Any conventional organic solvent that does not adversely affect the course of the reaction may be employed as a solvent in such reaction. Examples of organic solvents which may be used are Stoddard solvent, hexane, and other similar aliphatic-type solvents. In order to obtain the new compounds of our invention, we convert the reaction products so formed to the corresponding metal salts.

In obtaining the new compounds of our invention, we have found that in preparing the intermediate reaction products which are subsequently to be employed in forming the corresponding metal salts, the presence of an organic solvent is not necessary, although advantageous, as it permits ease of operation and ordinarily yields an excellent product. As an example of operating in the absence of an organic solvent, the necessary amount of Friedel-Crafts catalyst may be added to a mixture comprising naphthenic acids and a phenol over a period of time and at a temperature substantially above room temperature, and the resulting mixture is then heated at a temperature substantially above room temperature and for a time sufficient to effect reaction between the naphthenic acids and the phenol. The reaction products so obtained are then converted to the corresponding metal salts, as before, to obtain the new compounds of our invention. In forming the metal salts of our invention, we may treat the intermediate reaction product with any suitable metal compound, although we have found that best results are secured by using metal compounds based on lithium, magnesium, barium, calcium, aluminum, nickel and zinc.

In preparing the new compounds of our invention, we have found that the amounts of reactants necessary to obtain the desired reaction products are not critical and may be varied over a wide range, although we prefer to employ, for best results, about 1 mol of naphthenic acids to about 1 to 2.7 mols of phenols. The amount of Friedel-Crafts catalyst needed is similarly not critical and need only be present in an amount sufficient to catalyze the condensation reaction. Generally about 0.05 to 0.25 mol of catalyst per mol of reactants has been found to provide good results.

We have found that the new compounds of our invention are useful as detergents, especially as additives for mineral oil lubricants. In the lubrication of internal combustion engines of all types, particularly when severe operating conditions are encountered, mineral lubricating oils frequently prove unsatisfactory because they tend to deposit varnish, gum and sludge on the engine surfaces, such as cylinder walls, pistons and rings, and also to induce corrosion of bearing materials. A small amount of the new compounds of our invention when added to mineral oil lubricants will act as a detergent to inhibit or prevent the formation of engine deposits encountered in the use of mineral oil lubricants, and suspend or disperse very small particles of deterioration products or contaminating materials in the lubricant. Generally, the addition of about 1.0 to 7.0 per cent and preferably 1.7 to 3.0 per cent by weight of the mineral oil is sufficient to effect the desired improvement. Of the metal salts of our invention which may be employed as detergents for use in mineral oil lubricants, we have obtained especially good results with the salts of lithium, magnesium, barium, calcium, aluminum, nickel, and zinc.

The following example illustrates one method of obtaining the new compounds of our invention.

EXAMPLE 1

A mixture comprising 400 grams of naphthenic acids having a molecular weight of about 292, 400 grams of p-cresol, 64 grams of aluminum chloride and 1500 milliliters of Stoddard solvent was stirred and kept at slow reflux for five hours at a temperature of about 300° to about 375° F. at atmospheric pressure, after which the reaction mixture was poured over ice and concentrated hydrochloric acid to decompose the catalyst complex. The Stoddard solvent layer was first washed with 10–15%

*Table I*

| Example No. | 1 | 2 | 3 |
|---|---|---|---|
| Reactants: | | | |
| Napthenic Acids, gms. | 400 (1.37 mols) | 585 (2 mols) | 585 (2 mols) |
| p-Cresol, gms. | 400 (3.7 mols) | 216 (2 mols) | |
| m-Cresol, gms. | | | 216 (2 mols) |
| Aluminum Chloride, gms. | 64 | 64 | 64 |
| Stoddard Solvent, ml. | 1,500 | 1,500 | 1,500 |
| Reflux Time, hrs. | 5 | 5 | 5 |
| Crude Product Properties: | | | |
| Analysis: | | | |
| C,[1] percent | 74.3 | 74.5 | 76.0 |
| H,[1] percent | 10.8 | 11.7 | 11.1 |
| Molecular Weight [1] | 427 | 305 | 273.0 |
| Neutralization No. (ASTM D-663) | 7.74 | 55.7 | 157.0 |
| Saponification No. (ASTM D-94) | 166.3 | 161.3 | 180.4 |
| Properties of Nickel Salt: | | | |
| C, percent | 60.1 | 66.0 | 69.7 |
| H, percent | 9.3 | 10.0 | 11.2 |
| Ni, percent | 12.56 | 9.54 | 8.55 |
| Molecular Weight | 1,030 | 749 | 822 |
| Engine Tests: | | | |
| Oil Make-Up: | Base Oil | | |
| Nickel Salt Wt. percent | | 1.67 | 3.0 | 2.91 |
| 450/3 Paramid Oil, Wt. percent | 100 | 98.33 | 97.0 | 97.09 |
| Oil Inspections: | | | |
| Gravity °API | 29.0 | 27.8 | 27.7 | 28.0 |
| Viscosity, SUS at 100° F | 463 | 484 | 487 | 475 |
| Viscosity, SUS at 210° F | 61.3 | 61.0 | 62.5 | 62.3 |
| Viscosity Index | 96 | 89 | 96 | 98 |
| Flash Point, COC, ° F | 465 | 450 | 485 | 470 |
| Fire Point, COC, ° F | 510 | 515 | 525 | 545 |
| Pour Point, ° F | −5 | 0 | +10 | +5 |
| Color, NPA | 2 | 2½ | 3+ | 3+ |
| Sulfur, percent | 0.20 | 0.28 | 0.15 | 0.14 |
| Carbon Residue, percent | 0.07 | 0.75 | 0.95 | 0.74 |
| Neutralization No. | 0.01 | 0.92 | 1.77 | 1.94 |
| Saponification No. | 0.08 | 2.6 | 4.8 | 5.9 |
| Ash, percent | 0.01 | 0.28 | 0.4 | 0.30 |
| S/C Lauson (Diesel Procedure) Test: | | | |
| Length of Test, Hours | 48 | 216 | 216 | 216 |
| Piston Color at End of Test | 1 | 5+ | 8+ | 5+ |
| Stuck Rings at End of Test | 1 | 0 | 0 | 0 |
| Merit Rating at End of Test | 57 | 80 | 93 | 80 |

[1] Micro-analysis.

hydrochloric acid several times to remove aluminum compounds and then with water until neutral. The Stoddard solvent was removed by steam distillation, leaving a brown tacky solid having a molecular weight of 427. The adduct was mixed with five to ten times its amount of water, and an aqueous solution of sodium hydroxide was then added until the solution was strongly basic. Nickel nitrate was added with stirring to this solution until all the nickel salt precipitated out. The water layer was then poured off, and the salt remaining was dissolved in hexane and washed three times with water. The hexane solution was filtered by passing through diatomaceous earth to remove suspended insoluble material therein and then evaporated under heat to remove the hexane and water. The nickel salt obtained had a molecular weight of 1030 and contained 60.1 per cent carbon, 9.3 per cent hydrogen and 12.56 per cent nickel. Several additional runs were made in which either the amounts of some of the reactants were varied or the substituted phenol employed was changed. The results of each of these runs are tabulated in Table I. Also included in Table I are results obtained showing the use of the metal salts prepared as detergents in mineral lubricating oils.

The results of S/C Lauson (diesel procedure) engine tests in Table I run upon the base oil containing relatively small amounts of these nickel salts show the salts to have good detergent action. We have found that antioxidants may be added to oils containing the metal salts of this invention without adversely affecting the detergency properties of the salts.

The S/C Lauson (diesel procedure) test employed in Table I is conducted in the following manner. A single cylinder Lauson engine developing 3 horsepower is charged with 2.1 pounds of test oil and operated at full load at a speed of 1860±10 revolutions per minute with an oil temperature of 225° F.±2° F. and a coolant temperature of 300° F.±2° F. At the end of each 24 hours of operation, the engine is stopped and observations are made on the piston skirt deposit and on the piston ring condition. The piston skirt deposit is rated on a scale of 0 to 10 where 10 is a rating for a piston with no deposits and 0 for a piston with very heavy deposits. The piston ring condition is observed for tightness, sticking, and/or plugging of rings. Plugging applies only to the oil rings. The test is continued for a total of 216 hours unless excessive deposits or sticking of rings occurs earlier in the test. The performance of the oil is expressed in terms of the piston rating, piston ring condition, and overall merit rating. A merit rating of 100 defines a piston free of deposits with no oil sticking or oil ring plugging.

The following example illustrates a method of obtaining the new compounds of our invention in the absence of an organic solvent such as benzene, Stoddard solvent and the like.

EXAMPLE 4

A mixture comprising 800 grams of naphthenic acids having a molecular weight of about 263 and 328 grams of p-cresol was heated to a temperature of 300° F. and 90.2 grams of aluminum chloride were slowly added to the mixture over a period of 1½ hours, during which addition the temperature varied from 300° to 310° F. The reaction mixture was then stirred for three additional hours at a temperature of 350° F., at the end of which time the reaction mixture was poured into ice and concentrated hydrochloric acid, extracted with benzene, washed until the water wash was neutral, and the benzene removed by distillation leaving 896 grams of the reaction product having a neutralization value of 46, a saponification number of 171.8 and consisting of 75.95 per cent carbon and 10.00 per cent hydrogen. Nickel and calcium salts having saponification numbers of 142.0 and 48.0, respectively, were prepared by reacting this reaction product with nickel nitrate and calcium nitrate, respectively, in the manner described hereinabove. The calcium salt, however, need not be prepared from the sodium salt, as described above, but may, if desired, be prepared by reacting the reaction product of naphthenic acids and phenol with calcium hydroxide.

Additional nickel salts of the condensation product of napthenic acids and various phenols were prepared and the results are tabulated below in Table II. The material identified as "Cresol C" in this table is a mixture containing 43 per cent meta-cresol, 24 per cent para-cresol, 14 per cent phenol, 8 per cent ortho-cresol, and 10 per cent low boiling xylenols; "Cresylic Acid X-1" is a mixture containing 60 per cent low boiling xylenols, 17 per cent meta-cresol, 10 per cent para-cresol, 10 per cent high boiling xylenols, and 2 per cent phenol; and "Cresylic No. 2" is a mixture containing 90 per cent high boiling xylenols and acids boiling above xylenols and 7 per cent low boiling xylenols.

*Table II*

| Example No. | 4 | 5 | 6 | 7 | 8 |
|---|---|---|---|---|---|
| Reactants Used: | | | | | |
| Naphthenic Acids, gms | 1,517 | 731.3 | 731.3 | 731.3 | 731.3 |
| p-Cresol, gms | 559 | | | | |
| Isopropylphenol, gms | | 340 | | | |
| Cresol C, gms | | | 270 | | |
| Cresylic Acid X-1, gms | | | | 305.5 | |
| Cresylic No. 2, gms | | | | | 305.5 |
| Aluminum Chloride, gms | 165.8 | 80 | 80 | 80 | 80 |
| Reaction Conditions: | | | | | |
| Total Reaction Time, hrs | 4½ | 5 | 5 | 5 | 5 |
| Aluminum Chloride Addition, hrs | 1½ | 2 | 2 | 2 | 2 |
| Temp. During Aluminum Chloride Addition, °F | 310-325 | 300-310 | 300-310 | 300-310 | 300-310 |
| Temp. During Rest of Reaction, °F | 350-355 | 300-375 | 300-325 | 300-340 | 300-340 |
| Product (Nickel Salt): | | | | | |
| Yield of Nickel Salt, gms | 1,326 | 952.1 | 908.4 | 841.2 | 610.2 |
| Yield of Nickel Salt, wt. Percent Based on Naphthenic Acids + Phenols | 64 | 88.9 | 90.7 | 81.2 | 59.1 |
| Solubility in 450/3 Paramid Oil, wt. percent | >5 | >5 | >5 | >5 | >5 |
| Ash, Percent (Calculated) | 10.4 | 8.60 | 10.4 | 8.20 | 9.80 |
| Neutralization No | 36 | 74 | 65.0 | 76.6 | 52.2 |

It is readily apparent from Table II that metallic salts of this invention are readily soluble in mineral oils. Each of the five salts listed in Table II was a dark green rubbery solid product.

We have shown above the preparation of nickel and calcium salts in accordance with our invention. In order to show that our invention is not so limited and that other metal salts may be prepared from our intermediate reaction product, we have run several additional experiments, including others using nickel and calcium, the results of which are tabulated in Table III.

Table III

| Example No. | 9 | 10 | 11 | 12 | 13 | 14 | 15 |
|---|---|---|---|---|---|---|---|
| Metal Salt Prepared | Li | Ba | Ca | Mg | Ni | Zn | Al |
| Naphthenic Acid—p-Cresol Reaction Product Used, gms. | 289 | 289 | 289 | 217.2 | 107.00 | 289 | 217.2 |
| Yield of Salt, gms. | 125.9 | 248.4 | 289 | 162.9 | 87.64 | 233.1 | 224.3 |
| Appearance of Product | (1) | (2) | (2) | (2) | (3) | (2) | (2) |
| Solubility in Base Oil, wt. percent | <5 | <5 | >5 | >5 | >5 | >5 | <5 |
| Ash, percent (Calculated) | 2.60 | 7.80 | 6.40 | 7.00 | 12.60 | 10.20 | 3.40 |
| Neutralization No. (Calculated) | 15.0 | 7.00 | 19.6 | ⁴ 4.40 | 30.0 | 48.0 | 19.6 |

¹ Dark brown tacky solid.
² Dark brownish red semi-solid.
³ Deep green solid.
⁴ Base number.

The metal salts in Examples 10 to 15 were prepared by reacting 1462 grams of naphthenic acids having a molecular weight of about 263 and 540 grams of p-cresol in the presence of 160 grams of aluminum chloride. The aluminum chloride was added at 300° to 310° F. over 1¼ hours. The temperature was maintained at 330±5° F. for the remainder of the 4½ hour total reaction time, poured over ice and concentrated hydrochloric acid, extracted with benzene, washed until the water wash was neutral, and the benzene removed by boiling. This reaction product was mixed with five to 10 times its amount of water at 140° F. and an aqueous solution of sodium hydroxide added until the solution was strongly basic. The corresponding metal nitrate was added with stirring to this solution until all the metal salt precipitated out. The water layer was then poured off and the salt remaining was dissolved in hexane and washed three times with water. The hexane solution was filtered by passing through diatomaceous earth to remove suspended insoluble material therein and then evaporated under heat to remove the hexane and water.

In preparing the lithium salt, the adduct was dissolved in benzene and a LiOH solution was added in an amount more than is needed to react with all of the acid present. This solution was boiled to remove water and benzene and the residue was extracted with benzene. The extract was then filtered through celite and the benzene was removed by distillation, leaving the lithium salt.

The lithium, barium and aluminum salts are not completely soluble in oil at five per cent; however, the calcium, magnesium, nickel and zinc salts are soluble at five per cent. Apparently slightly more than the expected amount of magnesium reacted, for the magnesium salt has a base number, whereas all the other salts have rather high neutralization numbers. This excess of magnesium probably accounts for the relatively high ash content of this salt.

In addition to adding an antioxidant to the mineral oils containing the new compounds of our invention, we may incorporate in the mineral oils other addition agents normally added to mineral lubricating oils for a specific purpose, such as pour point depressants, corrosion inhibitors, foam suppressants and the like, without adversely affecting the detergent benefits of this invention.

Although we have shown that the new compounds of our invention may be employed as detergents, especially as addition agents for mineral oil lubricants, it is apparent that the metal salts of this invention may be added to mineral oil lubricants in amounts sufficient to obtain a grease thereby.

Obviously, many modifications and variations of the invention, as hereinabove set forth, may be made without departing from the spirit and scope thereof, and therefore only such limitations should be imposed as are indicated in the appended claims.

We claim:

1. A method of preparing a new compound, which comprises reacting a mixture consisting essentially of naphthenic acids and at least one phenol wherein at least one mol of the phenol is present for each mol of naphthenic acids in the presence of a Friedel-Crafts catalyst at an elevated temperature of at least 200° F. for a time sufficient to effect reaction between the naphthenic acids and the phenol, and thereafter reacting the resulting reaction product with an inorganic metal salt capable of forming the corresponding metal salt thereof.

2. A method of preparing a new compound, which comprises reacting a mixture consisting essentially of naphthenic acids and at least one phenol having the following structural formula:

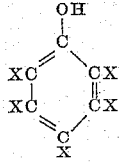

wherein X is selected from the group consisting of hydrogen and alkyl groups having from one to 12 carbon atoms, with the number of hydrogen atoms per molecule being at least one, wherein at least one mol of the phenol is present for each mol of naphthenic acids in the presence of a Friedel-Crafts catalyst at an elevated temperature of at least 200° F. for a time sufficient to effect reaction between the naphthenic acids and the phenol, and thereafter reacting the resulting reaction product with an inorganic metal salt capable of forming the corresponding metal salt thereof.

3. A method of preparing a new compound, which comprises reacting a mixture consisting essentially of naphthenic acids and at least one phenol wherein at least one mol of the phenol is present for each mol of naphthenic acids in the presence of a Freidel-Crafts catalyst at an elevated temperature of at least 200° F. for a time sufficient to effect reaction between the naphthenic acids and the phenol, and thereafter reacting the resulting reaction product with an inorganic nickel salt capable of forming the corresponding nickel salt thereof.

4. A method of preparing a new compound, which comprises refluxing a mixture consisting essentially of naphthenic acids, at least one phenol wherein at least one mol of the phenol is present for each mol of naphthenic acids and an organic solvent in the presence of a Friedel-Crafts catalyst at an elevated temperature of at least 200° F. for a time sufficient to effect reaction between the naphthenic acids and the phenol, and thereafter reacting the resulting reaction product with an inorganic metal salt capable of forming the corresponding metal salt thereof.

5. A method of preparing a new compound, which comprises slowly adding, over a period of time, to a mixture consisting essentially of naphthenic acids and at least one phenol, wherein at least one mol of the phenol is present for each mol of naphthenic acids a Friedel-Crafts catalyst at an elevated temperature of at least 200° F., refluxing the resulting mixture to effect reaction between the naphthenic acids and the phenol, and thereafter reacting the resulting reaction product with an inorganic metal salt capable of forming the corresponding metal salt thereof.

6. As a new compound, the product resulting from the process of claim 1.

7. As a new compound, the product resulting from the process of claim 2.

8. As a new compound, the product resulting from the process of claim 3.

9. A lubricant composition comprising a major amount, sufficient to increase the detergency properties thereof, of a mineral lubricating oil and a minor amount of the product as in claim 6.

10. A lubricant composition comprising a major amount, sufficient to increase the detergency properties thereof, of a mineral lubricating oil and a minor amount of the product as in claim 7.

11. A lubricant composition comprising a major amount, sufficient to increase the detergency properties thereof, of a mineral lubricating oil and a minor amount of the product as in claim 8.

12. A method of preparing a new compound which comprises reacting a mixture consisting essentially of naphthenic acids and p-cresol wherein at least one mol of p-cresol is present for each mol of naphthenic acids in the presence of a Friedel-Crafts catalyst at an elevated temperature of at least about 300° F. for a time sufficient to effect reaction between the naphthenic acids and p-cresol, and thereafter reacting the resulting reaction product with an inorganic metal salt capable of forming the corresponding metal salt thereof.

13. A method of preparing a new compound which comprises reacting a mixture consisting essentially of naphthenic acids and m-cresol wherein at least one mol of m-cresol is present for each mol of naphthenic acids in the presence of a Friedel-Crafts catalyst at an elevated temperature of at least about 300° F. for a time sufficient to effect reaction between the naphthenic acids and m-cresol, and therefore reacting the resulting reaction product with an inorganic metal salt capable of forming the corresponding metal salt thereof.

14. As a new compound, the product resulting from the process of claim 12.

15. As a new compound, the product resulting from the process of claim 13.

16. A lubricant composition comprising a major amount of a mineral lubricating oil and a minor amount, sufficient to increase the detergency properties thereof, of the product as in claim 14.

17. A lubricant composition comprising a major amount of a mineral lubricating oil and a minor amount, sufficient to increase the detergency properties thereof, of the product as in claim 15.

References Cited in the file of this patent

UNITED STATES PATENTS

| | | |
|---|---|---|
| 2,445,939 | Cook | July 27, 1948 |
| 2,307,615 | Barth | Jan. 5, 1943 |